(12) United States Patent
Kim et al.

(10) Patent No.: US 12,133,248 B2
(45) Date of Patent: Oct. 29, 2024

(54) METHOD BY WHICH TERMINAL TRANSMITS/RECEIVES SIDELINK SIGNAL IN WIRELESS COMMUNICATION SYSTEM FOR SUPPORTING SIDELINK, AND APPARATUS THEREFOR

(71) Applicant: LG Electronics Inc., Seoul (KR)

(72) Inventors: Heejin Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 17/632,952

(22) PCT Filed: Aug. 24, 2020

(86) PCT No.: PCT/KR2020/011260
§ 371 (c)(1),
(2) Date: Feb. 4, 2022

(87) PCT Pub. No.: WO2021/034167
PCT Pub. Date: Feb. 25, 2021

(65) Prior Publication Data
US 2022/0338202 A1    Oct. 20, 2022

(30) Foreign Application Priority Data

Aug. 22, 2019  (KR) .......... 10-2019-0103334
Aug. 22, 2019  (KR) .......... 10-2019-0103338

(51) Int. Cl.
*H04W 72/08*  (2009.01)
*H04W 72/542* (2023.01)
*H04W 92/18*  (2009.01)

(52) U.S. Cl.
CPC .......... *H04W 72/542* (2023.01); *H04W 92/18* (2013.01)

(58) Field of Classification Search
CPC .......... H04B 7/06; H04W 8/00; H04W 16/28; H04W 72/20; H04W 72/542; H04W 92/18
See application file for complete search history.

(56) References Cited

U.S. PATENT DOCUMENTS 10,541,848 B2 *  1/2020  Chae .............. H04W 72/20
11,025,334 B2 *  6/2021  Chae .............. H04B 7/14
(Continued)

FOREIGN PATENT DOCUMENTS

KR    20190089062    7/2019

OTHER PUBLICATIONS

Chae et al U.S. Appl. No. 62/842,235 titled âSidelink Bandwidth Part Interruption Mitigationa and filed May 2, 2019 (Year: 2019).*
(Continued)

*Primary Examiner* — Wutchung Chu
(74) *Attorney, Agent, or Firm* — Fish & Richardson P.C.

(57) ABSTRACT

Disclosed, according to various embodiments, are a method by which a first terminal performs beam pairing in a wireless communication system for supporting a sidelink, and an apparatus. Disclosed are a method and an apparatus therefor, the method comprising the steps of: determining a first resource region for communication through the exchange of a discovery message in a first discovery resource region; and transmitting a sidelink signal to a second terminal in the first resource region, wherein the first discovery resource region is linked, in advance, with a plurality of resource regions for communication, and the first terminal determines, on the basis of the measured value of the sidelink signal which is less than a first threshold value, a resource region in which a beam pair is reselected.

14 Claims, 20 Drawing Sheets

(56) References Cited

U.S. PATENT DOCUMENTS

| | | | | |
|---|---|---|---|---|
| 2017/0207845 | A1* | 7/2017 | Moon | H04B 7/088 |
| 2018/0375710 | A1* | 12/2018 | Chae | H04L 5/0048 |
| 2020/0128436 | A1* | 4/2020 | Chae | H04W 24/08 |
| 2020/0351859 | A1* | 11/2020 | Chae | H04W 72/20 |
| 2021/0212148 | A1* | 7/2021 | Liang | H04L 5/0044 |
| 2021/0352648 | A1* | 11/2021 | Yang | H04W 4/08 |
| 2022/0046631 | A1* | 2/2022 | Li | H04W 24/08 |
| 2022/0173854 | A1* | 6/2022 | Chae | H04L 1/1893 |

OTHER PUBLICATIONS

Ericsson, "Resource allocation for Mode-2 transmissions," R1-1907136, Presented at 3GPP TSG-RAN WG1 Meeting #97, Reno, US, May 13-17, 2019, 18 pages.

International Search Report in International Appln. No. PCT/KR2020/011260, dated Nov. 30, 2020, 5 pages (with English translation).

LG Electronics, "Discussion on physical layer structure for NR sidelink," R1-1907012, Presented at 3GPP TSG RAN WG1 #97, Reno, USA, May 13-17, 2019, 26 pages.

ZTE & Sanechips, "Overall consideration on NR V2X resource allocation," R2-1816981, Presented at 3GPP TSG-RAN WG2#104, Spokane, USA, Nov. 12-16, 2018, 7 pages.

* cited by examiner (a)

(b)

(a)

(b)

METHOD BY WHICH TERMINAL TRANSMITS/RECEIVES SIDELINK SIGNAL IN WIRELESS COMMUNICATION SYSTEM FOR SUPPORTING SIDELINK, AND APPARATUS THEREFOR

CROSS-REFERENCE TO RELATED APPLICATIONS

This application is a National Stage application under 35 U.S.C. § 371 of International Application No. PCT/KR2020/011260, filed on Aug. 24, 2020, which claims the benefit of Korean Application Nos. 10-2019-0103334, filed on Aug. 22, 2019, and 10-2019-0103338, filed on Aug. 22, 2019. The disclosures of the prior applications are incorporated by reference in their entirety.

TECHNICAL FIELD

Embodiments of the present disclosure relate to a method for transmitting and receiving a sidelink signal by a user equipment (UE) in a wireless communication system, and an apparatus for the same, and more particularly to a method and apparatus for selecting a pair of beams (hereinafter referred to as a beam pair) for transmitting and receiving a sidelink signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and apparatus for allowing a resource region scheduled to be used for beam pairing caused by a discovery operation to be reselected only when a measurement value for the quality of a sidelink signal is within a specific range, and minimizing the number of times of reselecting the resource region based on the discovery operation having a relatively long period, so that an unnecessary communication delay can be prevented and the half-duplex problem can be mitigated, resulting in an increase in efficiency of resource usage.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with one aspect of the present disclosure, a method for performing beam pairing by a first user equipment (UE) in a wireless communication system supporting sidelink may include determining a first resource region for communication through exchange of a discovery message in a first discovery resource region; and transmitting a sidelink signal to a second user equipment (UE) in the first resource region, wherein the first discovery resource region is pre-linked to a plurality of resource regions for communication; and the first UE determines a resource region to be used for reselection of a beam pair based on a measurement value for the sidelink signal less than the first threshold value.

Alternatively, based on a measurement value for the sidelink signal that is less than the first threshold value and is equal to or higher than a second threshold value, reselection of the beam pair is performed in the first resource region.

Alternatively, based on a measurement value for the sidelink signal that is less than the first threshold value and is equal to or higher than a second threshold value, reselection of the beam pair is performed in a second resource region selected based on at least one of a maximum transmit power, a congestion level, and a cyclic prefix (CP) length from among the plurality of resource regions.

Alternatively, the second resource region is a resource region in which a CP length longer than a CP length for the first resource region is configured, a maximum transmit power greater than a maximum transmit power for the first resource region is configured, or a congestion level lower than a congestion level for the first resource region is configured in the first resource region.

Alternatively, the second resource region is a resource region in which the highest maximum transmit power is configured, the lowest congestion level is measured, or the longest CP length is configured, from among the plurality of resource regions.

Alternatively, based on a measurement value for the sidelink signal that is less than the second threshold value and is equal to or higher than a third threshold value, reselection of the beam pair is performed in a third resource region linked to a second discovery resource region. Each of the second threshold value and the third threshold value is preconfigured with a value lower than the first threshold value.

Alternatively, the third resource region is a resource region selected from among resource regions obtained through exchange of the discovery message in the second discovery resource region.

Alternatively, the third resource region is selected from among the obtained resource regions based on at least one of a maximum transmit power, a congestion level, and a CP length.

Alternatively, the reselection of the beam pair includes at least one of a transmission/reception (Tx/Rx) operation and a beam sweeping operation of a beam measurement reference signal.

Alternatively, the measurement value of the sidelink signal is a measurement value for a reference signal received power (RSRP), a reference signal received quality (RSRQ), a signal-to-noise ratio (SNR), or a signal to interference plus noise ratio (SINR).

Alternatively, the first UE transmits, to the second UE, at least one of a beam sweeping direction related to reselection of the beam pair, a beam sweeping start beam index, and resource information of a beam management reference signal.

In accordance with another aspect of the present disclosure, a method for performing beam pairing by a second user equipment (UE) in a wireless communication system supporting sidelink may include determining a first resource region for communication through exchange of a discovery message in a first discovery resource region; and receiving a sidelink signal from a first user equipment (UE) in the first resource region. The first discovery resource region is pre-linked to a plurality of resource regions for communication, and the first UE determines a resource region to be used for reselection of a beam pair based on a measurement value for the sidelink signal less than the first threshold value.

In accordance with another aspect of the present disclosure, a first user equipment (UE) configured to perform beam pairing in a wireless communication system supporting sidelink may include a radio frequency (RF) transceiver; and a processor connected to the RF transceiver, wherein the processor is configured to: exchange a discovery message in a first discovery resource region under control of the RF transceiver; determine a first resource region for communication through the exchanged discovery message; transmit a sidelink signal to a second user equipment (UE) in the first resource region under control of the RF transceiver; and determine a resource region to be used for reselection of a beam pair based on a measurement value for the sidelink signal less than the first threshold value, wherein the first discovery resource region is pre-linked to a plurality of resource regions for communication.

In accordance with another aspect of the present disclosure, a second user equipment (UE) configured to perform beam pairing in a wireless communication system supporting sidelink may include a radio frequency (RF) transceiver; and a processor connected to the RF transceiver, wherein the processor is configured to: exchange a discovery message in a first discovery resource region under control of the RF transceiver; determine a first resource region for communication through the exchanged discovery message; receive a sidelink signal from a first user equipment (UE) under control of the RF transceiver; and requesting the first UE to determine a resource region to be used for reselection of a beam pair based on a measurement value for the sidelink signal less than the first threshold value, wherein the first discovery resource region is pre-linked to a plurality of resource regions for communication.

In accordance with another aspect of the present disclosure, a chip set configured to perform beam pairing in a wireless communication system supporting sidelink may include at least one processor; and at least one memory operatively connected to the at least one processor, and configured to store instructions such that the at least one processor performs specific operations by executing the instructions, wherein the specific operations include: exchanging a discovery message in a first discovery resource region; determining a first resource region for communication through the exchanged discovery message; transmitting a sidelink signal to a second user equipment (UE) in the first resource region; and determining a resource region to be used for reselection of a beam pair based on a measurement value for the sidelink signal less than the first threshold value, wherein the first discovery resource region is pre-linked to a plurality of resource regions for communication.

Alternatively, the processor is configured to control a driving mode of a device connected to the chip set, based on the determined resource region.

In accordance with another aspect of the present disclosure, a computer-readable storage medium configured to store at least one computer program including instructions such that at least one processor for use in a wireless communication system supporting sidelink performs specific operations of performing beam pairing by executing the instructions may include at least one computer program for allowing the at least one processor to perform an operation of performing beam pairing; and a computer-readable storage medium configured to store the at least one computer storage, wherein the specific operations include: exchanging a discovery message in a first discovery resource region; determining a first resource region for communication through the exchanged discovery message; transmitting a sidelink signal to a second user equipment (UE) in the first resource region; and determining a resource region to be used for reselection of a beam pair based on a measurement value for the sidelink signal less than the first threshold value, wherein the first discovery resource region is pre-linked to a plurality of resource regions for communication.

Advantageous Effects

Various embodiments of the present disclosure can allow a resource region scheduled to be used for beam pairing caused by a discovery operation to be reselected only when a measurement value for the quality of a sidelink signal is within a specific range, and can minimize the number of times of reselecting the resource region based on the discovery operation having a relatively long period, so that an unnecessary communication delay can be prevented and the half-duplex problem can be mitigated, resulting in an increase in efficiency of resource usage.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
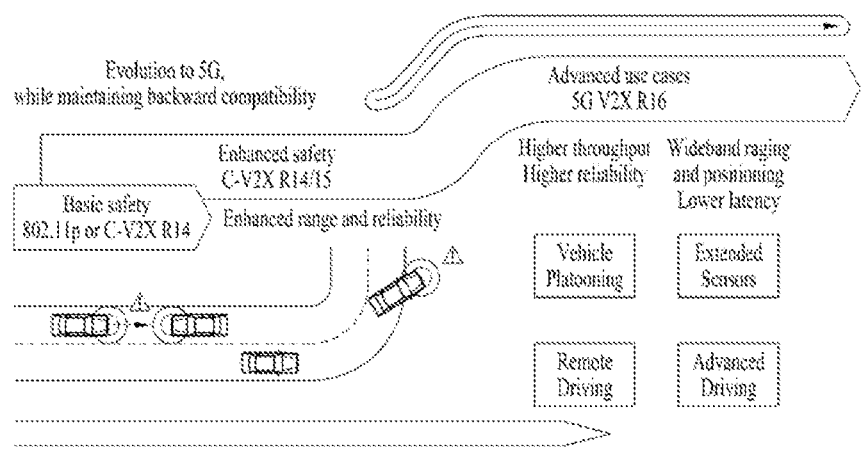
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
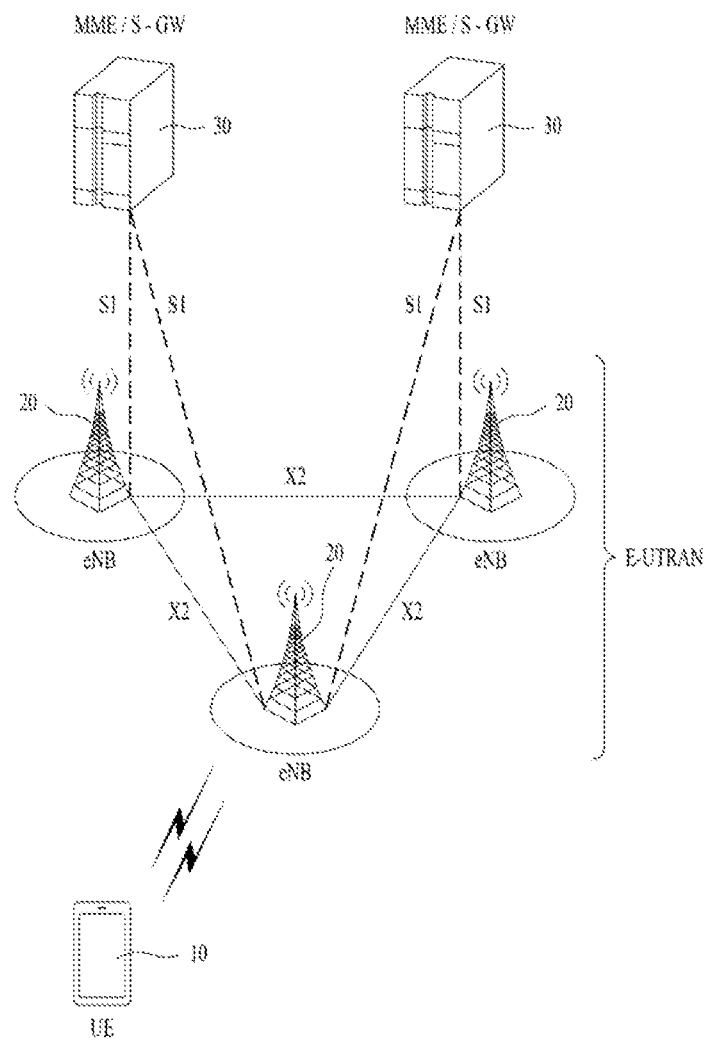
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
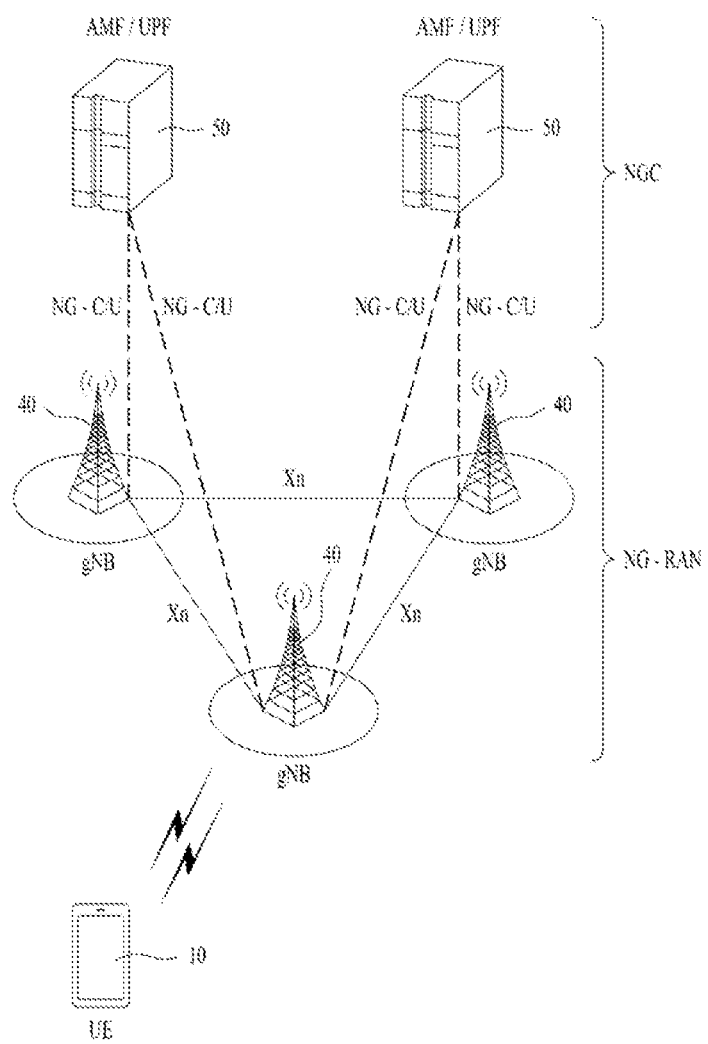
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
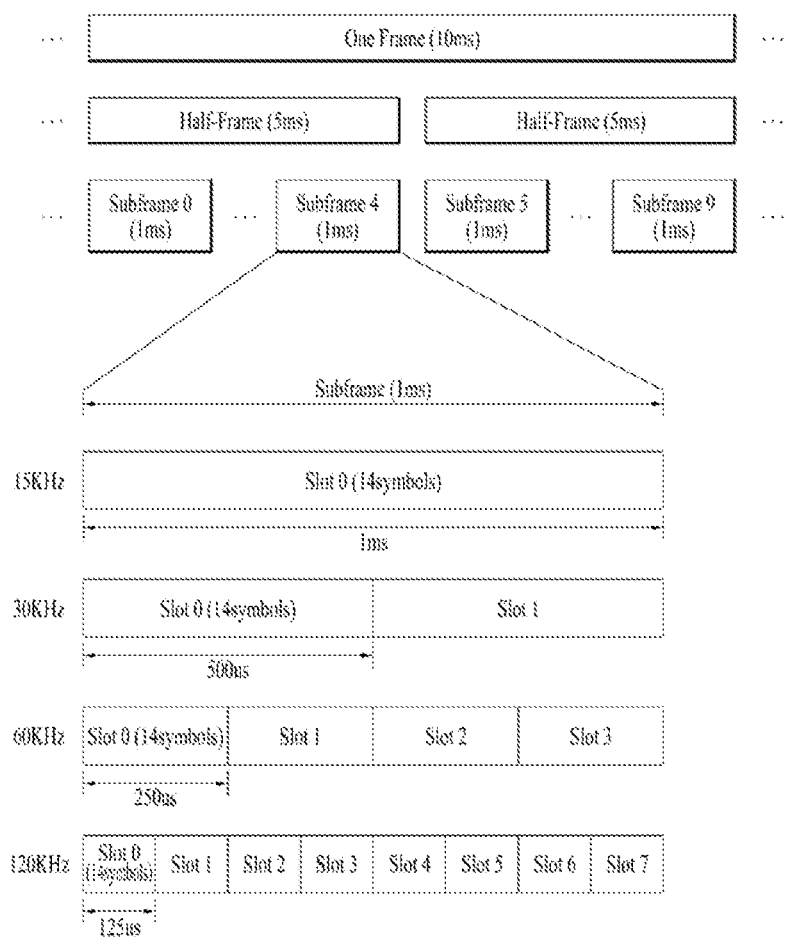
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
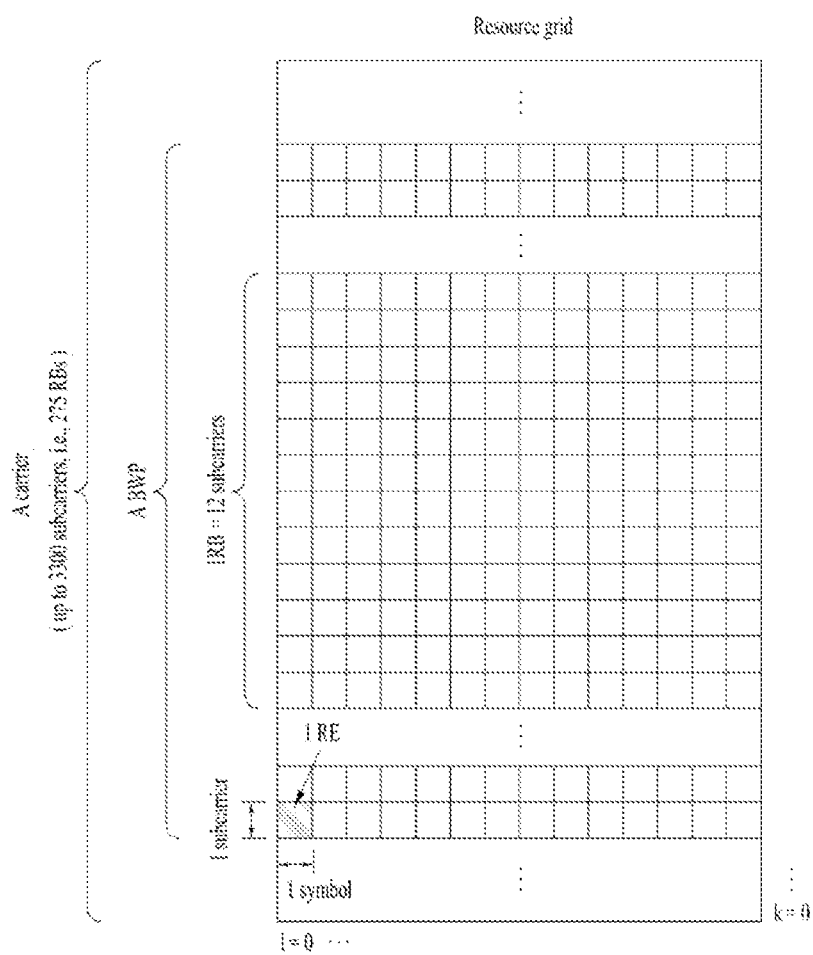
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
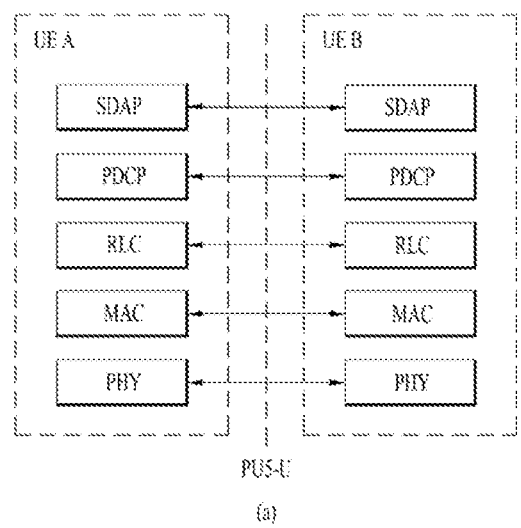
FIG. 6 illustrates a radio protocol architecture for SL communication.
Figure 6:
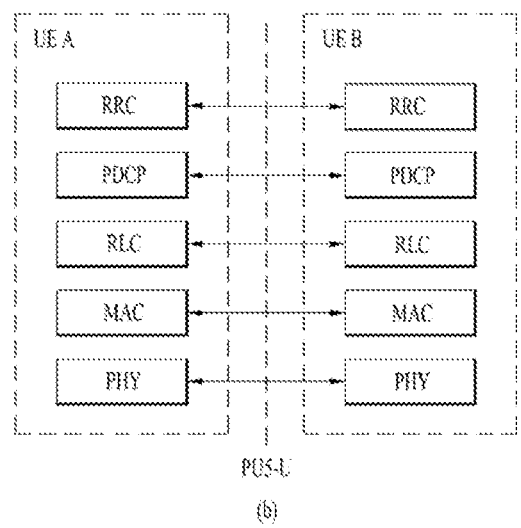

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be shortened. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
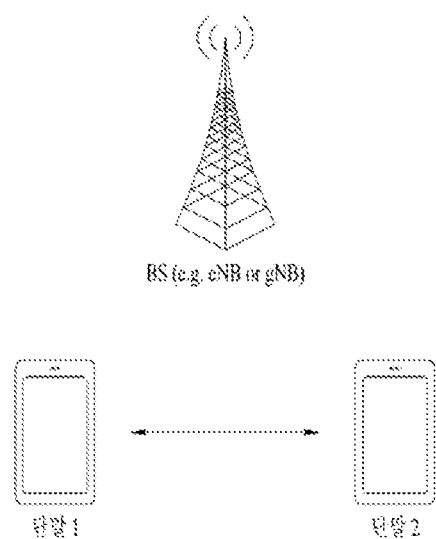
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
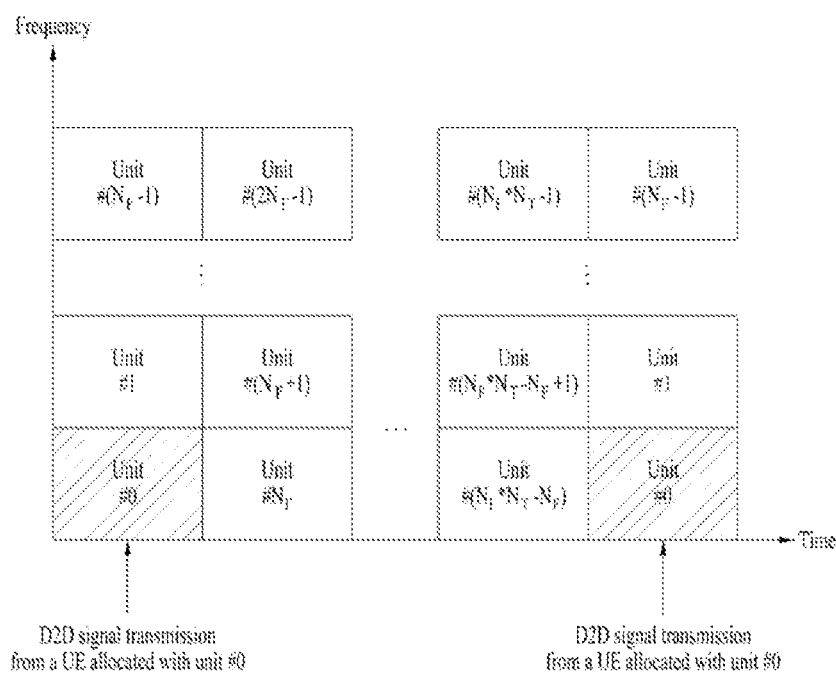
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.
  (1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.
  (2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.
  (3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
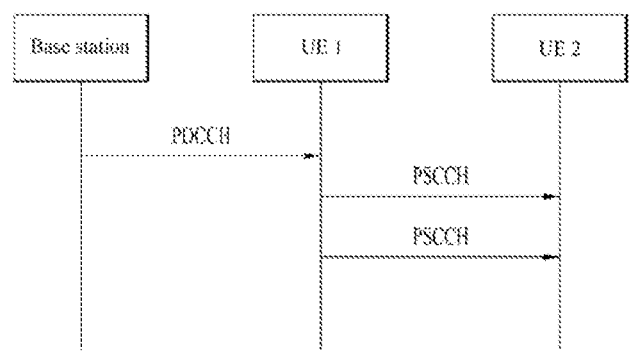
FIG. 9 illustrates a procedure in which UEs perform V2X or SL communication according to a transmission mode.
Figure 9:
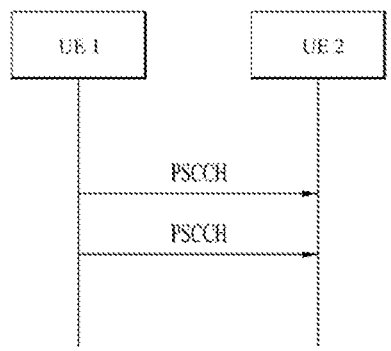

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARD) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Multiple Active Sidelink BWPs

In NR V2X, communication based on supporting a plurality of BWPs (i.e., communication based on supporting a plurality of configured sidelink BWPs and/or communication through supporting a plurality of active sidelink BWPs) may be considered. The reason why the above-described operation is performed is to support heterogeneous services/communications that require different numerologies, parameters and/or requirements, or is to reduce ICI caused by a shortened CP length.

A method of selecting a communication resource pool and/or BWP based on a discovery operation in consideration of the operation of supporting the plurality of BWPs will hereinafter be described.

Figure 10:
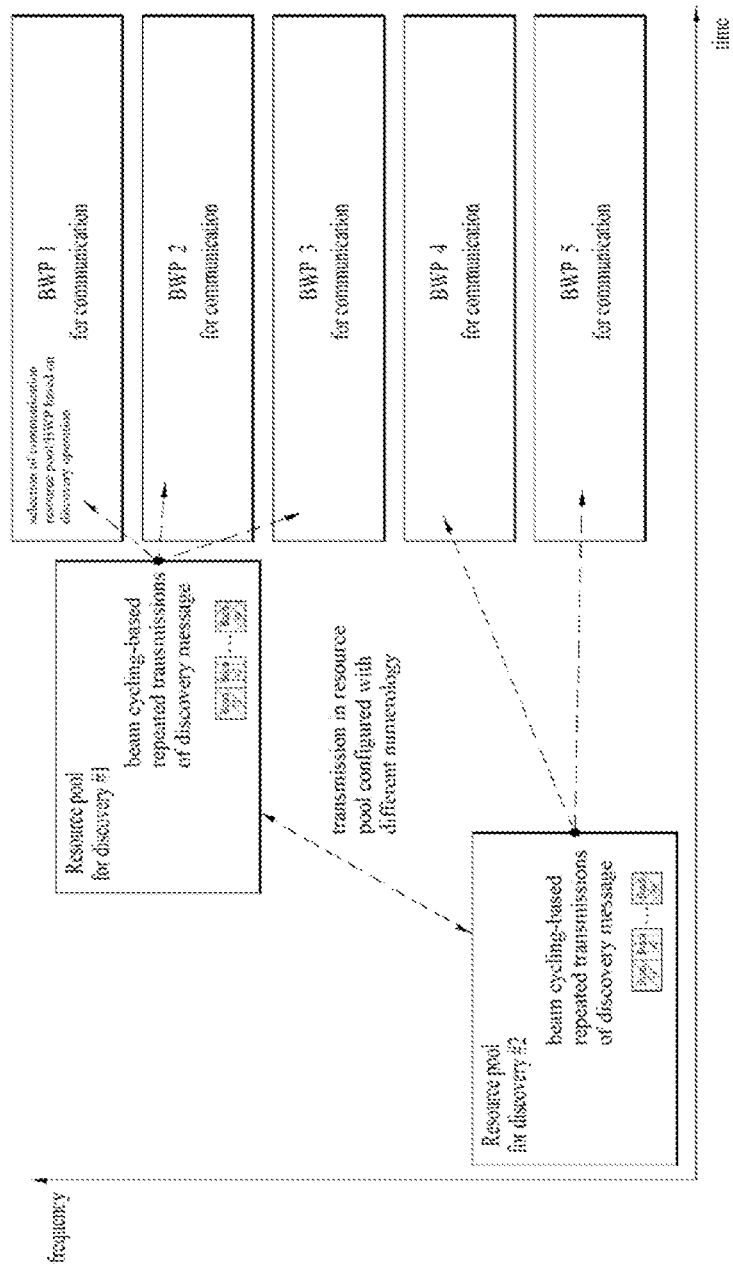
FIG. 10 is a diagram illustrating a method for performing a discovery procedure in sidelink communication in which a plurality of bandwidth parts (BWPs) is supported.

FIG. 10 is a diagram illustrating a method for performing a discovery procedure in sidelink communication in which a plurality of bandwidth parts (BWPs) is supported.

Referring to FIG. 10, the UE may search for a Tx-Rx unicast pair using a discovery message or a discovery signal, may select numerology to be used for sidelink data communication (or may select a resource pool/BWP in which numerology to be used is configured), or may perform beam sweeping and/or beam selection. In addition, through the discovery operation, the UE may establish a connection or session between the Rx UE and the Tx UE (in terms of communication) in the selected (and/or recommended) resource pool and/or BWP, and may perform transmission and reception of data packets.

On the other hand, in the following description, for convenience of explanation, a resource pool or BWP related to a discovery operation or procedure, or a resource pool or BWP related to sidelink and a discovery operation or procedure will hereinafter be defined as a discovery resource pool or a discovery BWP. In the following description, the above resource pool or BWP may be interpreted as a resource pool for communication or a BWP for communication as needed.

At least one discovery resource pool (and/or discovery BWP) associated with the discovery operation may be configured, and one or more discovery resource pools (or one or more discovery BWPs) may be configured with the same or different numerologies. Alternatively, the same or different at least one numerology may also be configured in one discovery resource pool (or a discovery BWP). For example, the plurality of BWPs (or discovery BWPs) having different numerologies may be configured in one discovery resource pool (or one resource pool).

Alternatively, at least one discovery resource pool (or at least one discovery BWP) associated with the above-described discovery operation may be subjected to TDM and/or FDM. As shown in FIG. 10, discovery resource pools are subjected to TDM, and some sections or symbols at the foremost or rearmost region of each discovery resource pool (or each discovery BWP) may be configured with a guard gap (or a switching gap). Here, the guard period (or switching gap) may be configured or used either as a switching section of the discovery BWP or the discovery resource pool or as a switching section of the numerology. Alternatively, the switching gap or the guard gap may be configured or required in the same or similar manner as in the resource pool or BWP for communication selected through the above discovery operation.

On the other hand, at least one condition may be considered in connection with the selection of numerology (or a resource pool/BWP in which the corresponding numerology is configured) to be used for communication. Here, the resource pool and/or BWP configured for transmission/reception of a communication-related signal may be a resource pool and/or BWP for control information, data, scheduling information, etc. for use in sidelink.

Resource pool and/or BWP for communication in which the same numerology (e.g., SCS, CP type) as the discovery resource pool (and/or BWP) is configured.

Resource pool and/or BWP for communication configured with an SCS smaller than an SCS of the discovery resource pool (and/or BWP).

Resource pool and/or BWP for communication configured with a CP length that is longer than a CP length (e.g., extended CP) of the discovery resource pool (and/or BWP).

That is, for numerology to be used for communication, the SCS and/or CP type should be determined such that the CP length that is not shorter than the CP length associated with either the discovery resource or the resource pool to be used for communication.

Alternatively, at least one resource pool/BWP satisfying the above-described conditions for each discovery resource pool may be pre-linked, and a pair of UEs (hereinafter referred to as UE pair) having succeeded in a discovery procedure within a specific resource pool may select any one of a resource pool and/or a BWP for at least one communication linked to a corresponding discovery resource pool. For example, as shown in FIG. 10, BWP #1, BWP #2, and BWP #3 (or resource pools #1, #2 and #3 for communication) may be pre-linked to a discovery resource pool (and/or BWP) #1.

Transmission and reception of a discovery message may be performed between one UE and the other UE within each discovery resource pool. When the reception (Rx) UE succeeds in decoding the discovery message, and/or when the transmission (Tx) UE succeeds in receiving/decoding the discovery response message, the Tx UE and the Rx UE may select at least one resource pool or at least one BWP to be used for communication (or transmission/reception of data information, control information, or packets) in consideration of at least one of the following conditions from among communication BWPs (or resource pools or carriers) linked to either the resource pool/BWP or the corresponding discovery BWP to which the discovery message (and/or the discovery response message) is transmitted.

Resource pool (or BWP) for communication in which relatively high maximum transmit (Tx) power is allowed Resource pool (or BWP) for communication with a relatively low congestion level (e.g., low CBR))

Resource pool (or BWP) for communication in which numerology having a relatively short CP length is configured If the priority of a packet to be transmitted is greater than or equal to a specific value (e.g., if PPPP is equal to or less than a specific value), the resource pool (or BWP) in which the SCS and(or) the CP type, each of which guarantees a relatively long CP length, are configured can be used.

In other words, the Rx UE may acquire information about a discovery message or a discovery response message (or a received discovery message or a received discovery response message) that has been successfully decoded, or may acquire information about the plurality of resource pools (or BWPs) linked based on the numerology (e.g., SCS, CP type) of either the discovery message or the discovery response message, so that the Rx UE can select a resource pool or BWP to be used for communication from among the plurality of resource pools (or BWPs) based on at least one of transmit (Tx) power, a congestion level, a CP length, and/or priority of a transmit (Tx) packet for each resource pool.

Specifically, a resource pool and/or BWP configured to be used for communication may be selected or recommended as follows. Selection or recommendation of the resource pool and/or BWP may be performed by any one of the Tx UE and the Rx UE for use in the discovery operation. If selection or recommendation of the resource pool and/or BWP is performed by the Rx UE, information (e.g., BWP index) about the selected or recommended resource pool and/or BWP may be included in the discovery response message and signaled. If selection or recommendation of the resource pool and/or BWP by the Tx UE is performed, information (e.g., BWP index) about the selected or recommended resource pool and/or BWP may be signaled from the Tx UE to the Rx UE in the form of a subsequent message of the discovery response message.

Alternatively, a resource pool and/or BWP for communication may be selected or recommended as follows when transmission and reception of a discovery message based on a plurality of discovery resource pools and/or discovery BWPs configured with different numerologies are performed.

Specifically, the Rx UE may signal at least one discovery response message including information about the recommended or selected resource pool/BWP from among communication resource pool(s)/BWP(s) linked to all discovery resource pools/BWPs, even when a discovery message is received (or successfully decoded) in each of the plurality of discovery resource pools. In other words, the Rx UE may transmit a discovery response message including information (e.g., BWP index) about a resource pool or BWP for communication to be selected or recommended in at least one discovery resource pool without transmitting a response message for each of the plurality of discovery messages received from the plurality of discovery resource pools. Through the above-mentioned operation, the Rx UE can minimize a half-duplex problem caused by transmission of the plurality of discovery response messages and/or an increase in interference/overhead.

For example, as shown in FIG. 10, resource pools (or BWPs) #1, #2, and #3 for communication may be linked to a discovery resource pool (or discovery BWP) #1, and resource pools (or BWPs) #4 and #5 for communication may be linked to a discovery resource pool (or discovery BWP) #2. In this case, based on the result of receiving each of the discovery resource pools (or discovery BWPs) #1 and #2, the Rx UE may signal (1) resource pool (or BWP) information for communication preferred for each of the discovery resource pools (or discovery BWPs) #1 and #2 through the same or different discovery response messages. Alternatively, based on the result of receiving each of the discovery resource pools (or discovery BWPs) #1 and #2, the Rx UE may select (2) at least one of a resource pool or BWP (corresponding to BWPs #1, #2, and #5 in FIG. 10) for all communications linked to the discovery resource pools (or discovery BWPs) #1 and #2, and may signal a discovery response message including information about the selected communication resource pool or BWP.

Alternatively, the discovery response message may be equally (repeatedly) transmitted in all discovery resource pools/BWPs in which the discovery message was transmitted, or may be selectively transmitted in only one discovery resource pool/BWP selected from among the discovery resource pools/BWPs in which the discovery message was transmitted.

For example, the discovery response message may be transmitted through a discovery resource pool and/or a discovery BWP linked to a selected/recommended communication resource pool/BWP. Alternatively, the Rx UE may select at least one discovery resource pool/BWP from among the plurality of discovery resource pools (or from among discovery resource pools in which the discovery message was transmitted and/or from among discovery resource pools linked to the selected resource pool/BWP), and may transmit the discovery response message through the selected discovery resource pool/BWP. Specifically, the UE may select at least one discovery resource pool in consideration of at least one of congestion level (or CBR), maximum allowable transmit (Tx) power, CP length (or CP type), and/or SCS for each discovery resource pool.

For example, the UE may select a discovery resource pool (or discovery BWP) having the lowest congestion level (or CBR) from among the plurality of discovery resource pools, may select a discovery resource pool (or discovery BWP) having the largest maximum Tx power, or may select a discovery resource pool (or discovery BWP) having the shortest CP length. Thereafter, the UE may transmit the discovery response message only in the selected discovery resource pool.

Alternatively, when the UE receives a selection message containing information about the selected or recommended resource pool/BWP for communication from a counterpart UE (which has received the discovery message or transmitted the discovery message), the UE may transmit, to the other UE, either a confirmation message indicating reception of the above message or an approval message indicating that the selected/recommended resource pool/BWP for communication will be used in subsequent communication (transmission and/or reception). For example, the UE may transmit the approval message or the confirmation/approval message in the discovery resource pool in which the selection message was received.

Beam Sweeping/Selection

The Tx UE may perform transmission of a discovery message based on beam cycling, and may receive information about the preferred beam of a counterpart UE (e.g., a beam index, an index of a resource linked to the beam, and information about the received RSRP (Reference Signals Received Power) value for a message transmitted by the corresponding beam) based on the received discovery response message. The Tx UE may perform selection of a beam to be used in subsequent communication based on information about the preferred beam.

On the other hand, the transmission/reception beam width used for such discovery may be different from the transmission/reception beam width used for communication, and information about a beam pair found in the discovery can be utilized as assistance information for determining an initial beam direction of subsequent communication. That is, between beams having different beam widths (e.g., Beam #X, Beam #Y), beam-related information (e.g., Beam #X) obtained based on only one beam width can be used as assistance information for beam determination having different beam widths (e.g., Beam #Y).

For example, when information about a first beam (Beam #X) is utilized as auxiliary information in determination of a second beam, the second beam (Beam #Y) may be determined as any one of a beam having (or a beam directed toward) an absolute direction of a beam selected from among the first beam (Beam #X), a beam having the highest beam gain in relation to the absolute direction of the selected beam, a beam having a high degree of overlap with the first beam (Beam #X), and/or a beam having the highest overlap ratio (or a beam having an overlap ratio that is equal to or greater than a specific reference threshold) with respect to the first beam (Beam #X). Alternatively, the second beam (Beam #Y) may be selected as one beam from among the plurality of beams satisfying the predetermined number of conditions (e.g., 2 conditions) among the above-mentioned conditions by an arbitrary reference or a preconfigured reference.

Alternatively, each of the beams (Beam #X, Beam #Y) having different beam widths may be a beam used for transmission and reception for different channels (or different data packets, different Tx resources) (for example, a carrier, a resource pool, a BWP, etc.), or may be defined as a beam used for transmission and reception of a signal in different frequency bands. For example, one of the first beam (Beam #X) and the second beam (Beam #Y) may be used for transmission and reception of a PSCCH, and the other one may be used for transmission and reception of a PSSCH. Alternatively, one of the first beam (Beam #X) and the second beam (Beam #Y) may be used for SCI (or SA) transmission and reception and the other one may be used for transmission and reception of data. Alternatively, one of the first beam (Beam #X) and the second beam (Beam #Y) may be used for transmission and reception of a discovery channel, and the other one may be used for transmission and reception of a control channel (or a data channel). Alternatively, the first beam (Beam #X) from among the first and second beams (Beam #X, Beam #Y) may be transmitted in a relatively low frequency band as compared to the second beam (Beam #Y). For example, the first beam (Beam #X) may be used for transmission and reception of a signal for use in a 28 GHz band and/or a 5.9 GHz band, and the second beam (Beam #Y) may be used for signal transmission and reception in a 63 GHz band.

Alternatively, the first and second beams (Beam #X, Beam #Y) are used for the same kind of channel, data packet, and transmission resource, but may be temporally separated (may temporally perform preceding or lagging) from each other. In this case, the first beam (Beam #X) may be a beam used for measurement and reporting of received signal strength and/or quality (e.g., RSRP, RSRQ, SINR, etc.) for transmission and reception, or a beam used in advance of the second beam (Beam #Y) in relation to HARQ. Here, the first beam may be different in beam width from the second beam. In this case, the first beam may be larger in width than the second beam, or the first beam may be smaller in width than the second beam.

In this case, the Tx UE for transmitting a message in a discovery resource pool (or discovery BWP) may not be the Tx UE for performing the operation of a signal (e.g., a control signal, a data signal, a PC5-RRC, etc.) transmitted from a resource pool (or BWP) for communication. For example, the Tx UE for transmitting a discovery message may be a target UE for receiving a data packet for communication. In this case, the type (or discovery model A) of the discovery message may be a message indicating "I am here" or may be a message having characteristics of a mode (discovery model B) querying "Who's there".

In other words, the UE for transmitting a discovery message in a discovery resource pool (or discovery BWP) may be a target UE designed to receive a data packet, etc. in the resource pool (or BWP) for subsequent communication. Alternatively, the UE configured to receive a discovery message within a discovery resource pool (or discovery BWP) may be used as the Tx UE designed to receive a data packet, etc. in the resource pool (or BWP) for subsequent communication. In other words, the transmitting and receiving subject of the discovery message is not necessarily identical to the subject to be used in subsequent communication.

On the other hand, the UEs may select (or recommend or configure) a resource pool or BWP by exchange of a discovery message (and/or a discovery response message) according to the above-mentioned method, may establish a connection for communication based on the selected resource pool or BWP, and may transmit and receive a data packet in the selected resource pool or BWP. Thereafter, the UEs may reselect or change the selected resource pool or BWP, or may reselect or change the beam pair. Hereinafter, a method for reselecting or changing the resource pool, the BWP, and/or the beam pair will be described with reference to the attached drawings.

Figure 11:
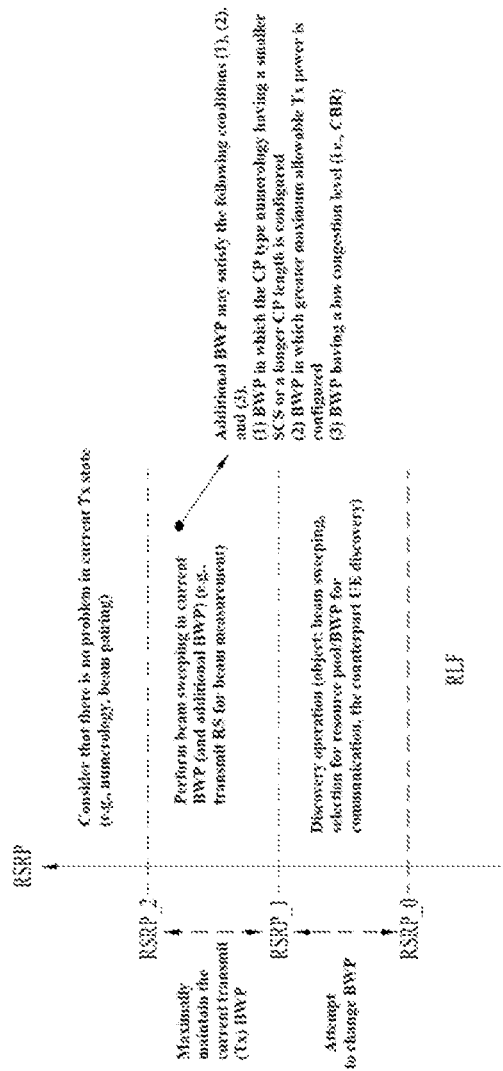
FIG. 11 is a diagram illustrating a method for reselecting a resource pool, a BWP, and/or a beam pair related to sidelink communication.

FIG. 11 is a diagram illustrating a method for reselecting a resource pool, a BWP, and/or a beam pair related to sidelink communication.

The discovery resource may have a relatively longer period than resources associated with communication. As a result, the resource pool or BWP related to communication caused by the discovery operation should be reselected whenever the quality of a link related to communication is degraded, or a large communication delay may occur when Tx/Rx beam coordination/reselection is performed. Therefore, transmission and reception of messages for either Tx/Rx beam coordination/reselection or resource pool/BWP reselection should be prevented from being frequently triggered.

For example, when the UE detects that the quality of a link related to communication is less than a threshold value of 1 and is equal to or higher than a specific threshold, the UE may perform the operation of forming a new beam pair while maintaining a current resource pool or BWP, instead of reselecting a resource pool or BWP caused by the discovery operation, resulting in an increase in communication link quality. Through the above-mentioned scheme, the proposed method can minimize frequent changes of the resource pool or BWP and at the same time can maximally prevent occurrence of radio link failure (RLF).

Referring to FIG. 11, a plurality of threshold values may be configured in relation to the quality of the communication link. The plurality of threshold values may be a plurality of threshold values for RSRP, a plurality of threshold values for RSRQ, a plurality of threshold values for SNR, or a plurality of threshold values for SINR. The UE may determine whether to change the beam pair while maintaining transmission (Tx) resources for the current communication based on the plurality of threshold values, and may determine whether to reselect a resource pool or BWP related to communication using a message (e.g., a discovery message and/or a discovery response message) for use in the discovery resource. That is, the UE may additionally perform the operation of re-searching and/or re-selecting a beam pair while maintaining a current resource pool or BWP on the basis of the plurality of threshold values.

Specifically, the UE may perform a resource reselection operation (reselection of a BWP, reselection of a resource pool, or reselection of a beam pair) on the basis of a measurement value (or a measurement-based calculated value) of RSRP (or SNR, SINR, RSRQ) and a plurality of preconfigured threshold values.

When the measured RSRP (or SNR, SINR, RSRQ) is equal to or higher than a second threshold value (RSRP_2) (i.e., in the first case), the UE may determine that there is no problem in a current link (or numerology, beam pair, Tx/Rx state, reception quality, received signal strength).

Alternatively, when the measured RSRP (or SNR, SINR, RSRQ) is equal to or greater than a first threshold value (RSRP_1), or is equal to or less than a second threshold value (RSRP_2) (i.e., in the second case), the UE can perform a trigger operation for changing or reselecting a beam pair (Tx/Rx beam pair) while maximally maintaining a current resource pool or BWP. Here, the above-mentioned trigger operation may perform triggering of execution of at least one of an operation for reporting Tx/Rx operations of the beam management RS, an operation (e.g., reporting of the beam sweeping result, and reporting of CSI) for reporting a management value of the beam management RS (e.g., CSI-RS, SSB, S-CSI-RS, S-SSB), and an operation for reporting beam information (or Tx resource information interworking with the corresponding beam) selected based on the above measurement value. In this case, the change or reselection of the beam pair may be performed for beam candidates indicating all Tx/Rx candidates (or all transmission/reception candidates), or may be preconfigured only for some candidate beams from among all Tx/Rx candidates (or Tx or Rx candidates).

Alternatively, when the measured RSRP (or SNR, SINR, RSRQ) is equal to or higher than the $0^{th}$ threshold value (RSRP_0) and is less than a first threshold value (RSRP_1) (i.e., in the third case), the UE may perform the operation (or a counterpart UE discovery operation for communication) for changing or reselecting a resource pool or BWP for communication on the basis of a discovery operation (i.e., an operation of transmitting and receiving signals in a discovery resource pool or BWP). That is, an exemplary case in which the measured RSRP (or SNR, SINR, RSRQ) has a value between the $0^{th}$ threshold value and the first threshold value may refer to a trigger condition for performing the discovery procedure (or related to the counterpart UE discovery operation) of reselecting or changing the resource pool and/or BWP.

Alternatively, when the measured RSRP (or SNR, SINR, RSRQ) is less than the $0^{th}$ threshold value (RSRP_0) (i.e., in the fourth case), the UE may declare radio link failure (RLF) for the current resource pool or BWP.

On the other hand, in the above second case, the UE may perform the Tx/Rx operation of a beam management RS for change (or management or reselection) of a beam pair corresponding to only a resource pool and/or BWP in which current communication is performed. Alternatively, as shown in FIG. 10, the UE may perform communication at a resource pool and/or BWP selected from among the plurality of resource pools and/or BWPs linked to discovery resource pools or discovery BWPs, and the operation of changing or reselecting the beam pair and/or the operation of reporting the measurement value of the beam management RS (e.g., CSI-RS, SSB, S-CSI-RS, S-SSB) may be performed only for the linked resource pools and/or BWPs. In this case, conditions that can be used for additional beam measurement in the other resource pool and/or BWP other than the current resource pool or BWP from among the linked resource pools or BWPs, can be configured as follows:

Resource pool (or BWP) in which a greater maximum transmit (Tx) power than that of the current resource pool or BWP is allowed (in terms of instantaneous viewpoint and/or statistical (e.g., average) viewpoint)

Resource pool (or BWP) having a lower congestion level (in terms of instantaneous viewpoint and/or statistical (e.g., average) viewpoint) than the current resource pool or BWP, and/or Resource pool (or BWP) in which numerology having a longer (or shorter) CP length than the current resource pool or BWP is configured, for example, a resource pool (or BWP) in which a smaller SCS is configured and/or a CP type (i.e., extended CP) having a longer CP length is configured.

In addition, through the above operation, the resource pool or BWP for communication can be reselected or changed. For example, in each of the plurality of resource pools or BWPs satisfying the above conditions, transmission and reception (and/or reporting of the measurement result) of the beam management RS may be performed, a resource pool or BWP having the highest RSRP/SINR/RSRQ/SNR may be selected, or a resource pool or BWP (or at least one resource pool/BWP from among the plurality of resource pools/BWPs satisfying the above conditions) in which each of RSRP/SINR/RSRQ/SNR is equal to or higher than a specific threshold may be selected as a resource pool or BWP for subsequent communication.

In addition, in the above third case, the UE may perform a discovery operation for reselection (and/or reselection or change/measurement of a beam pair, and a discovery operation of the counterpart UE) of a resource pool or BWP. The UE may select at least one of a preconfigured discovery resource pool or a preconfigured discovery BWP, and may perform transmission/reception (or signaling of a specific signal) of a discovery message in the selected discovery resource pool or BWP. In this case, the UE may select a discovery resource pool or a discovery BWP satisfying at least one of the following conditions from among at least one discovery resource pool or at least one discovery BWP, and may perform the operation described in the third case within the selected discovery resource pool or the discovery BWP.

Resource pool or BWP in which a greater maximum transmit (Tx) power than the current resource pool or BWP is allowed (in terms of instantaneous viewpoint and/or statistical (e.g., average) viewpoint), (or a discovery resource pool or discovery BWP linked to a resource pool or BWP in which maximum transmit (Tx) power greater than that of the current resource pool or BWP is allowed), (or a discovery resource pool or discovery BWP in which a maximum transmit (Tx) power greater than that of the discovery resource pool or discovery BWP linked to the current resource pool or BWP is allowed).

Resource pool or BWP having a lower congestion level (e.g., a lower CBR) than the current resource pool or BWP (in terms of instantaneous viewpoint and/or statistical (e.g., average) viewpoint), (or a discovery resource pool or discovery BWP linked to a resource pool or BWP having a lower congestion level than the current resource pool or BWP), (or a discovery resource pool or discovery BWP having a lower congestion level than a discovery resource pool or a discovery BWP linked to the current resource pool or BWP).

Resource pool or BWP in which numerology having a longer (or shorter) CP length than the current resource pool or BWP is configured (for example, in which a smaller SCS is configured and/or a CP type having a longer CP length is configured), (or a discovery resource pool or discovery BWP linked to the resource pool or BWP in which numerology having a longer (or shorter) CP length than the current resource pool or BWP is configured), (or a discovery resource pool or discovery BWP in which numerology having a longer (or shorter) CP length than the discovery resource pool or discovery BWP linked to the current resource pool or BWP).

For example, the UE may select one discovery resource pool or one discovery BWP from among at least one discovery resource pool or at least one discovery BWP based on at least one of a CP length, a maximum transmit (Tx) power, and a congestion level. Next, the UE may select one resource pool based on a CP length, a maximum Tx power and/or a congestion level from among the plurality of resource pools for communication linked to the selected discovery resource pool, and may change a resource region for communication to the selected one resource pool.

In addition, when the discovery resource pools or the discovery BWPs (i.e., a plurality of candidate discovery resource pools) satisfying the at least one condition are used, one candidate discovery resource pool can be selected from among the plurality of candidate discovery resource pools based on the following selection criteria. In this case, the UE may perform the operation of the above third case in the selected candidate discovery resource pool or the selected candidate discovery BWP.

Selection may be performed based on priority that is preconfigured among the CP length, the maximum Tx power, and the CBR (for example, the first priority is set to the CP length, the second priority is set to the maximum Tx power, and the third priority is set to the third priority).

Additionally or alternatively, random selection from among all available candidate discovery resource pools or all available candidate discovery BWPs may be performed.

The UE may perform the operation corresponding to the third case so as to prevent beam-pair reselection or beam sweeping from being performed in the unnecessary discovery resource pool or discovery BWP, so that the half-duplex problem can be mitigated and resource usage efficiency can be increased. In addition, the UE may select the discovery resource pool or discovery BWP for the discovery operation according to the above-mentioned conditions, so that the UE can minimize the number of execution times of the operation for unnecessarily performing such beam-pair reselection or beam sweeping within all the configured discovery resource pools or all discovery BWPs. As a result, the half-duplex problem can be mitigated and the efficiency of resource usage can be maximized.

In addition, in the above examples shown in FIG. 11 and the above-mentioned embodiments, the UE can perform reselection/change of a resource pool (or BWP) (for communication), numerology, and beam pairing by performing signaling of a discovery message Tx/Rx operation in the discovery resource pool (or discovery BWP) in response to detection of the third case, and can also perform the counterpart UE discovery operation.

In contrast, when there is a resource pool or BWP that satisfies at least one or all of the following conditions in the plurality of resource pools and/or BWPs that are configurable in connection with current communication, the UE may attempt to reselect/change (or may perform reselection/ change) of the resource pool (or BWP), numerology, and beam pair for subsequent communication using signaling of the resource pool/BWP in response to detection of occurrence of the third case. In this case, whereas the discovery operation for the counterpart UE may be impossible, the discovery operation for the counterpart UE may be restricted as needed.

Resource pool (or BWP) in which a greater maximum transmit (Tx) power than that of the current communication resource pool or BWP is allowed Resource pool (or BWP) having a lower congestion level (e.g., a lower CBR) than the current communication resource pool or BWP Resource pool (or BWP) in which numerology having a longer (or shorter) CP length than the current communication resource pool or BWP is configured (for example, a resource pool/BWP in which a smaller SCS is configured and/or a CP type (i.e., an extended CP) having a longer CP length is configured)

In addition, the above-mentioned operation of using signaling of the resource pool and/or BWP for communication may be defined as an operation of using transmission and/or reception of scheduling information, control information, data, reference signal (RS), x-bit indicator, etc. that are transmitted in the resource pool/BWP for communication.

In the above-described embodiments, it is assumed that a plurality of sections (four sections in FIG. 11) are divided on the basis of threshold values for the same kind of measurement values (for example, RSRP) so that a subsequent operation (e.g., BWP reselection, beam pair reselection, counterpart UE discovery, RLF declaration, etc.) of the UE about each of the plurality of sections can be determined. However, the present disclosure can also be divided into various sections according to various thresholds without being limited to the case of being divided into four sections. For example, a subsequent operation of the UE corresponding to some sections from among the four sections shown in FIG. 11 may be defined, or the entire section for use in the present disclosure may also be divided into at least five sections and a UE subsequent operation corresponding to each of the five sections may also be defined.

In addition, at least one threshold value among a plurality of threshold values related to the UE subsequent operation may be a threshold value for other types of measurement values. For example, a threshold value for determining the absence of a problem in current transmission/reception and for determining whether a reselection trigger operation is performed by the beam pair while maintaining the current BWP may be set to a threshold value for RSRP (and/or SNR), and a threshold value for determining whether a reselection trigger operation and a BWP reselection trigger operation are performed by the beam pair in a situation where the current BWP is maintained may be set to a threshold value for SINR (and/or RSRQ).

On the other hand, the UE may determine a subsequent operation of the UE by comparing the plurality of thresholds with an RSRP (and/or a measurement value such as SNR/SINR, etc.) measured directly on the basis of a data packet and the like, or may determine a subsequent operation of the UE by comparing the plurality of thresholds with an RSRP (and/or a measurement value such as SNR/SINR and/or a measurement-based calculation value) reported from a counterpart UE (e.g., reported from the Tx UE to the Rx UE). In other words, a measurement value to be compared with the threshold value may be a measurement value measured directly on the basis of Tx/Rx signals or may be a measurement value that is measured by the counterpart UE and reported to either the UE or the BS by measuring a counterpart UE. Alternatively, the counterpart UE may report the measurement value to the BS, and the BS may inform the UE of either the measurement value or information about the measurement value.

On the other hand, in the embodiments described above, the transmission and reception (Tx/Rx) capability of the UE capable of receiving the plurality of resource pools and/or BWPs in which different (or identical) numerologies are constructed at the same time should be further considered as needed. As an example, when the UE has no ability to simultaneously transmit and/or receive the plurality of resource pools/BWPs in which the same or different numerologies are configured at the same time point (or when the UE has restricted capability), the following operations can be additionally required. Specifically, the operation of an embodiment (i.e., a first embodiment) related to the discovery operation or procedure described with reference to FIG. 10 may be performed, and the operation of an embodiment (i.e., a second embodiment) related to reselection or change of the resource pool or BWP for communication described with reference to FIG. 11 may be performed, and as such a detailed description thereof will be given later.

Figure 12:
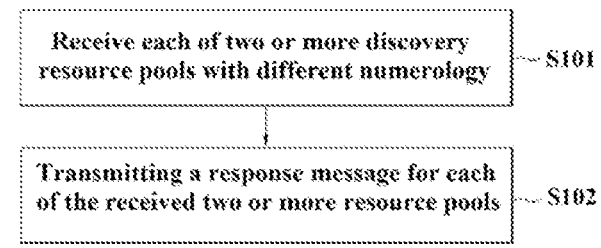
FIG. 12 is a flowchart illustrating a method for configuring a resource pool or BWP for communication through a discovery procedure by a UE.

FIG. 12 is a flowchart illustrating a method for configuring the resource pool or BWP for communication through a discovery procedure by the UE.

Referring to FIG. 12, in connection with the first embodiment, the UE may receive at least two discovery resource pools having different numerologies (S101). Furthermore, the UE may transmit a response message for each received discovery resource pool (S102). The UE may transmit i) different response messages in the respective discovery resource pools, or may repeatedly transmit ii) the same response message in the respective discovery resource pools.

According to the first embodiment, a discovery resource pool or discovery BWP in which at least different numerologies are configured from among the discovery resource pools or discovery BWPs may appear in a TDM format, or a discovery message of different numerologies may be TDM-transmitted and/or TDM-received. In contrast, a time required for message transmission and reception using the plurality of discovery resource pools/BWPs may increase.

Alternatively, the discovery response message for the discovery message may be transmitted in each of all discovery resource pools or each of all discovery BWPs. Alternatively, the Rx UE having received the discovery message may transmit a discovery response message corresponding to the received discovery message to each of all discovery resource pools or each of all discovery BWPs. In this case, although the discovery response message transmitted in each discovery resource pool/BWP can be transmitted in duplicate, the scope or spirit of the present disclosure is not limited thereto, and different discovery response messages may also be transmitted in each discovery resource pool/BWP as needed. In other words, the discovery response message transmitted in each discovery resource pool/BWP may include the same information (or information about the same selected resource pool or BWP), or may include different types of information (or information about different selected resource pools or BWPs.

For example, resource pools (or BWPs) #1, #2, and #3 for communication may be linked to a discovery resource pool (or discovery BWP) #1, and communication resource pools (or BWPs) #4 and #5 may be linked to a discovery resource pool (or discovery BWP) #2. In this case, the Rx UE may select a resource pool or BWP corresponding to each of the discovery resource pools (or discovery BWPs) #1 and #2 based on the result of reception of the discovery resource pools (or discovery BWPs) #1 and #2, and may transmit a discovery response message including information about the selected resource pool or BWP for each of the discovery resource pools (or discovery BWPs) #1 and #2. In this case, the discovery response message transmitted in the discovery resource pool (or discovery BWP) #1 may have information different from the discovery response message transmitted in a discovery resource pool (or discovery BWP) #2.

Alternatively, the Rx UE may select one/some preferred communication resource pools (or BWPs) from among all/some communication resource pools (corresponding to BWPs #1, #2, and #5 in FIG. 10) linked to discovery resource pools (or discovery BWPs) #1 and #2. In other words, the Rx UE may select at least one preferred resource pool or BWP from among all resource pools or BWPs (BWPs #1~#5 in FIG. 10) linked based on the discovery message received at the discovery resource pools (or discovery BWPs) #1 and #2. In this case, the Rx UE may repeatedly transmit a discovery response message including common information (information about the at least one selected resource pool or BWP) within the discovery resource pools (or discovery BWPs) #1 and #2. Alternatively, signaling of the selected communication resource pool (or BWP) information/recommendation may also be performed through repeated transmission of the same discovery response message within the discovery resource pools (or discovery BWPs) #1 and #2. Alternatively, the above-mentioned signaling may also be performed through repeated transmission of the same discovery response message within all the selectable discovery resource pools or BWPs (or all the considerable discovery resource pools or BWPs) as needed. The above-mentioned repeated transmission of the same discovery response message may aim to improve the reliability of signaling reception about selection/recommendation of the communication resource pool (or BWP).

Figure 13:
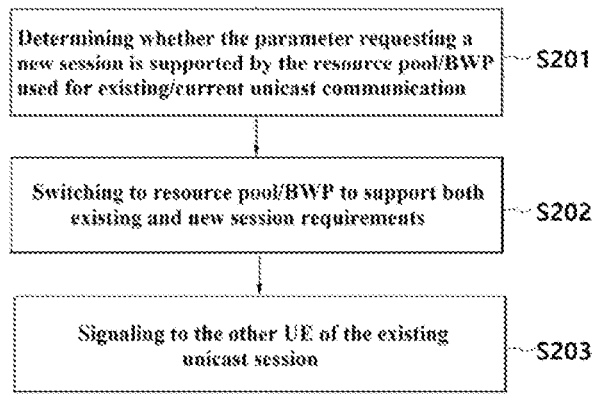
FIG. 13 is a flowchart illustrating an operation for allowing the UE to form a new unicast session.

FIG. 13 is a flowchart illustrating an operation for allowing the UE to form a new unicast session.

Referring to FIG. 13, in connection with the second embodiment, the UE may determine whether a parameter requested by a new session is supported in the resource pool or BWP used in the legacy/current unicast communication (S201). If the parameter requested by the new session is not supported (S201), the UE may switch to the resource pool or BWP capable of supporting both the legacy session requirement and the new session requirement (S202). The UE may signal information about the above switching to the counterpart UE of the legacy unicast session (S203).

Specifically, when it is necessary for the UE to additionally form a new (transmission or reception) target UE and a unicast session, the UE can maximally use or select the legacy unicast session (or unicast sessions) so as to form the above requested unicast session, so that overhead of the BWP switching can be minimized.

However, if the parameter or numerology (e.g., CP length, SCS, CP type, etc.) requested by a new (added) session is not supported in the resource pool/BWP used in the legacy/current unicast communication, the UE may switch to the resource pool or BWP capable of supporting both the legacy session requirement and the new session requirement (e.g., parameter or numerology).

In other words, determination of whether a first parameter required for a session to be newly added is different from a second parameter for the legacy unicast session may be considered to be a trigger condition for reselection or change of the resource pool or BWP about the legacy unicast session. Alternatively, occurrence of an exemplary case in which the first parameter is not supported in the resource pool/BWP used in the legacy unicast communication may be considered to be a trigger condition for reselection or change of the resource pool or BWP about the legacy unicast session.

Alternatively, in a situation where the first parameter and the second parameter are different from each other (or if the first parameter is not supported in the resource pool/BWP used in the legacy unicast communication), if reselection or change of the resource pool or BWP is performed for the legacy unicast session, the UE may transmit a message for triggering reselection or change of the legacy resource pool or BWP to the counterpart UE of the legacy unicast session or may indicate information about occurrence of the trigger event through physical layer signaling or higher layer signaling. In this case, the counterpart UE may be the same as the pair UE for forming a new session (for example, in the case where the plurality of unicast sessions should be configured between the Tx/Rx UE pairs), or the counterpart UE may be different from the pair UE (for example, in the case where the plurality of unicast sessions should be configured between different Tx/Rx UE pairs, and overlap may occur between some target Tx/Rx UEs).

In addition, in order to minimize interruption of on-going session communication (or interference to current session communication), the UE may allow communication for a new session only in the resource pool or BWP for the on-going session during a predetermined time, or communication for a new session may be allowed in another resource pool or BWP through TDM. Here, the predetermined time may be defined as a time consumed until an operation of reselecting resources (e.g., a resource pool, a BWP, an actual transmission resource) related to the on-going session is triggered.

Thereafter, if reselection of the resource (e.g., a resource pool, BWP, and actual transmission resource) related to the on-going session is triggered, the UE may perform the operation of (re)selecting a new resource pool or BWP (and/or the operation of moving to the resource pool or BWP or merging with the legacy resource pool or BWP) appropriate for both the on-going session and the new session (or common parameter and common numerology capable of satisfying efficiency requirements).

Figure 14:
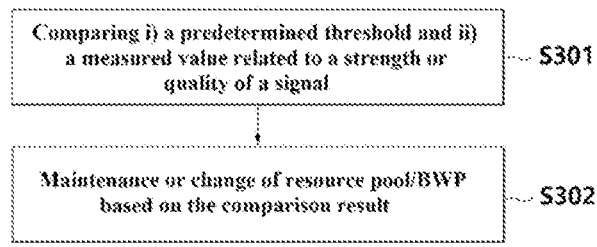
FIG. 14 is a flowchart illustrating a method for allowing the UE to change a resource pool or BWP based on the above threshold value.

FIG. 14 is a flowchart illustrating a method for allowing the UE to change a resource pool or BWP based on the above threshold value.

Referring to FIG. 14, the UE may compare i) a preconfigured threshold value with ii) a measurement value (e.g., RSRP, SNR or SINR) related to the strength or quality of signals (S301). Furthermore, the UE may maintain or change the resource pool and/or BWP according to the result of comparison (S302). Specifically, as shown in FIG. 11, the UE may perform resetting of the resource pool or BWP for communication or may change a beam pair based on at least one preconfigured threshold value.

On the other hand, although the above-described embodiments have been focused on unicast for convenience of description, the scope or spirit of the present disclosure is not limited thereto, and the proposed technology can also be applied to multicast, groupcast, and broadcast in addition to unicast.

For example, the UE may receive a plurality of discovery response messages from a plurality of counterpart UEs (or a plurality of target UEs) in a discovery resource pools and/or discovery BWPs, and may perform selection of the resource pool (or BWP) and/or beam pairing for communication based on the received discovery response messages.

In this case, the UE may select a resource pool and/or BWP for all UEs (i.e., all multicast target UEs) or may select a response pool and/or BWP for some of the plurality of UEs by grouping the plurality of UEs. For example, the UE may perform grouping of the plurality of UEs into a plurality of groups, and may select the resource pool and/or BWP corresponding to each group.

Alternatively, when the resource pool/BWP for the plurality of target UEs serving as a multicast or groupcast target is selected, the UE may select either numerology capable of being commonly applied/valid for all the target UEs or at least one resource pool and/or BWP in which such numerology is constructed, based on the plurality of received discovery response messages.

Alternatively, the UE may perform grouping of the plurality of target UEs serving as a multicast or groupcast target based on the received discovery response messages, and may select either numerology applicable to (or efficient or appropriate for) each group and/or at least one resource pool and/or BWP in which such numerology is constructed.

For example, if it is difficult to set numerology which can be commonly applied to all of the plurality of target UEs, the UE may perform grouping of UEs in which common numerology can be constructed from among the plurality of target UEs, and may configure the resource pool and/or BWP corresponding to each group.

Meanwhile, when grouping the plurality of target UEs (i.e., multicast target UEs) into a plurality of groups, some of the plurality of target UEs may belong to at least two groups of the plurality of groups. Specifically, the UE may be configured to belong to two or more groups for a target UE satisfying the following conditions. In other words, some of the plurality of target UEs may be considered to be an additional candidate resource pool or BWP (candidate) for communication with a resource pool and/or BWP satisfying the following conditions, or may be allowed to perform/attempt data packet transmission and reception for the same communication even in the resource pool or BWP satisfying the following conditions. Alternatively, when the following conditions are satisfied, a specific target UE may commonly belong to the plurality of groups.

A resource pool or BWP in which greater maximum transmit (Tx) power is allowed (or a group having a resource pool or BWP in which greater maximum transmit (Tx) power is configured for the resource pool or BWP for a group to which a specific UE belongs) may be used.

Additionally or alternatively, a resource pool or BWP having a low congestion level (e.g., a low CBR) (or a group in which a resource pool or BWP having a lower congestion level than the other resource pool or BWP to which a specific UE belongs) may be used.

Additionally or alternatively, a resource pool or BWP in which numerology having a longer (or shorter) CP length is configured, for example, a resource pool and/or BWP (or a group in which a resource pool or BWP having a longer (or shorter) CP length than the other resource pool or BWP for a group to which a specific UE belongs is configured) in which a smaller SCS is configured and/or a CP type (i.e., extended CP) having a longer CP length is configured, can be used.

Figure 15:
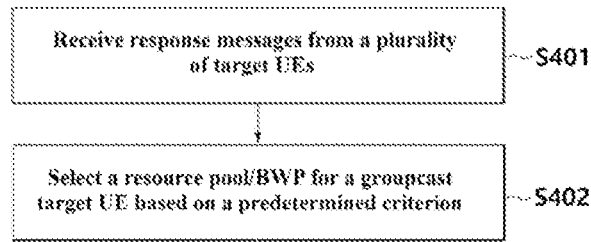
FIG. 15 is a flowchart illustrating a method for allowing the UE to configure a resource pool or BWP for groupcast target UEs.

FIG. 15 is a flowchart illustrating a method for allowing the UE to configure a resource pool or BWP for groupcast target UEs.

Referring to FIG. 15, the UE may receive a response message from the plurality of counterpart UEs in the discovery resource pool(s) or BWP(s) (S401). The UE may perform selection of the resource pool, BWP, or beam pair for communication based on the received response messages (S402). Here, the UE may select i) the resource pool or BWP for all the groupcast target UEs, or may select ii) each of a resource pool or BWP for some of the groupcast target UEs.

In another aspect of the present disclosure, the UE may apply, to the groupcast operation, the operation for determining or selecting beam pairing to be used for communication based on beam measurement information (and/or beam pairing information) obtained from the discovery resource pool or BWP. Transmit (Tx) beams (and/or Rx beams) applicable to all the groupcast target UEs may be selected, or Tx/Rx beams for each of the groupcast target UEs (or for each group obtained by grouping of the groupcast target UEs) may be selected. In this case, the UE may select a transmit (Tx) beam (or efficient Tx beam) commonly used for all groupcast target UEs. Here, the Rx beam may be configured differently for each groupcast target UE.

For example, when selecting the Tx beam (and/or the Rx beam) for all groupcast target UEs, the UE may select at least one Tx beam (and/or Rx beam) that can be commonly applied to (or efficiently used in) all groupcast target UEs based on the plurality of response messages received by the UE. In this case, the UE may select commonly available/valid transmit (Tx) beam from among the at least one Tx beam on the basis of the following at least one condition.

Specifically, the UE may determine the following at least one condition by referring to a preferred beam that was reported/answered by each groupcast target UE based on the discovery operation (and/or a beam management/measurement operation performed in the resource pool/BWP for communication).

The UE may determine a common transmit (Tx) beam on the basis of the following conditions (1), (2), and (3). In the first condition (1), the UE may determine whether a transmit (Tx) beam includes the same absolute direction or common/similar absolute directions within a specific error. In the second condition (2), the UE may determine a common transmit (Tx) beam by determining whether all/some overlap parts are present between preferred beams of all UEs. In the third condition (3), the UE may determine a common transmit (Tx) beam by determining whether the corresponding beam has the largest spatial overlap parts present between preferred beams of all UEs (or by determining that the overlap ratio of the corresponding beam is equal to or higher than a specific reference threshold value). The UE may select at least one beam satisfying at least one condition from among the above conditions, based on the above-mentioned conditions. On the other hand, when the number of candidate beams satisfying the at least one condition is set to 2 or more, one of the above-mentioned candidate beams may be selected according to a specific reference or may be selected at random.

Alternatively, groupcast target UEs may be divided into a plurality of groups, and available/efficient/appropriate communication Tx beam (and/or the corresponding Rx beam) for each group can be selected. In this case, grouping of the groupcast target UEs may be achieved according to the following grouping criteria (1), (2), and (3).

Based on such grouping, it is possible to consider a first condition (1) in which it is determined whether the Tx beam includes the same absolute direction or common/similar absolute directions within a specific error or shares the beam directed toward the common/similar absolute directions, it is possible to consider a second condition (2) in which all/some overlap parts are present between the preferred beams of the UE, and/or (3) it is also possible to consider a third condition (3) in which the spatial overlap ratio between preferred beams of the UE is equal to or higher than a specific reference threshold. In addition, the UE may perform grouping of groupcast target UEs based on the above grouping result, and may determine the beams determined by the above grouping criteria to be at least one Tx beam corresponding to each group. In this case, at least one target UE from among the groupcast target UEs may also belong to at least two groups.

Furthermore, as shown in FIG. 11, the UE may determine whether to instruct and recommend a state change on the basis of RSRP (and/or measurement values such as SNR/SINR/RSRQ) and preconfigured threshold values. For example, the UE may determine whether to maintain the operation for use in the current communication Tx resources, may determine whether to reselect the resource pool or BWP for communication within the discovery resources, or may determine whether to perform discovery of the counterpart UE.

On the other hand, values such as RSRP measured or calculated between the groupcast target UEs may be different from each other. In this case, there is a need for the UE to recommend or instruct a state change on the basis of different measurement values. For example, the UE should determine whether to maintain the operation for use in the current communication Tx resources, should determine whether to reselect the resource pool/BWP for communication within the discovery resources, should determine whether to perform discovery of the counterpart UE, and/or should determine whether to declare RLF.

Specifically, the UE may perform recommendation or instruction of the above state change on the basis of the lowest value from among measurement values (such as RSRP) of all target UEs or report values, and may recommend/instruct/select a state change corresponding to the most conservative or worst case from among the state change recommendation or instruction that was determined for each target UE. For example, the state change recommendation/indication triggered by a measurement value such as the lowest RSRP for use in the criteria of determining the state change of the respective target UEs may be selected, so that the selected information may be signaled to the plurality of target UEs.

In this case, the Tx UE may receive information about a state change recommendation from each target UE, may determine a state change required for the target UEs, and may provide or inform the target UEs of information about the determined state change. Alternatively, determination of the above necessary state change may be performed by any one of the target UEs or the BS. For example, each of the target UEs and/or the Tx UE may report, to the BS, information about selection/determination/reporting of the state change based on RSRP/SNR/SINR/RSRQ, and the BS may inform groupcast UEs (or some UEs or one UE) of Tx/Rx beam information to be used for communication of the UEs on the basis of the reported information.

Alternatively, when at least one Tx UE (and/or at least one Rx UE) from among the groupcast target UEs performs selection, determination and/or reporting of the above state change, signaling related to the selection, determination, and/or reporting of the performed state change should also be performed for the remaining UEs (groupcast Tx/Rx beams other than the UE participating in such selection/determination/reporting). In this case, signaling related to selection, determination and/or reporting of the performed state change may include signaling about selection, determination and/or reporting of the performed state change, triggering signaling of beam reselection or change, and signaling of information (e.g., transmit (Tx) time and frequency resource information of beam management RS, absolute direction (or beam index) in which beam sweeping is started, direction (e.g., clockwise or counterclockwise) of such beam sweeping, and a pattern of beam sweeping). For example, the beam pattern may be instructed or configured in advance, and may include information about a start direction, a start point (or a sweeping period, a start point can be designated by duration) of beam sweeping, and/or information about the beam sweeping direction.

In addition, a confirmation message for the preferred beam information report/recommendation, a confirmation message for state change reporting/recommendation/indication, a confirmation message for actual selected beam information recommendation/indication, and/or a confirmation message for the beam (/state change) recommendation/indication may not be transmitted in a resource pool, BWP, and/or carrier for communication. In particular, in a situation where RLF occurrence or beam reselection is required (e.g., if a measurement value such as RSRP where RLF occurrence or beam reselection is required is calculated), the above-mentioned information (or the above-mentioned confirmation message) may be transmitted in a resource pool, BWP and/or carrier for 5.9 GHz band sidelink or may be transmitted in the resource pool, BWP, and/or carrier for Uu.

Figure 16:
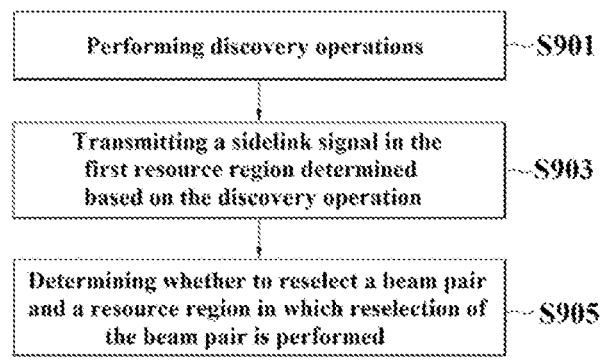
FIG. 16 is a flowchart illustrating an operation for allowing a first UE to reselect a beam pair.

FIG. 16 is a flowchart illustrating an operation for allowing a first UE to reselect a beam pair.

Referring to FIG. 16, a first UE may select or determine a first resource region required to perform communication through a discovery operation (S901). The first UE may select a first discovery resource region from among the plurality of preconfigured discovery resource regions, and may transmit a discovery message within the selected first discovery resource region. The first UE may receive a discovery response message of a second UE (or the Rx UE) in the first discovery resource region. The UE may select or determine any one resource region from among the plurality of resource regions for communication linked to the discovery resource region through exchange of the discovery message in the first discovery resource region. Here, the plurality of discovery resource regions may include at least two discovery resource regions in which different numerologies are configured, and the resource region may be defined as a structure corresponding to the above BWP or resource pool.

Alternatively, the discovery message may include configuration information about the plurality of resource regions for communication linked to the first discovery resource region, and the discovery response message may include information about the resource region that was selected or preferred to be a communication resource region from among the plurality of resource regions.

Alternatively, the plurality of resource regions linked to the discovery message may include at least two resource regions having different numerologies. Here, the operation of selecting any one of the plurality of resource regions may be an operation of selecting numerology for the communication (or sidelink communication). For example, the UE may determine transmit (Tx) parameters (or numerology) of the sidelink signal according to the CP type, SCS, and/or TTI preconfigured for the selected resource region.

Subsequently, the first UE may transmit a sidelink signal for communication in the first resource region (S903). The first UE may transmit the sidelink signal based on either a preconfigured transmission (Tx) parameter for the selected first resource region or a transmission (Tx) parameter corresponding to a numerology.

Subsequently, the first UE may determine whether to perform reselection or change of the current beam pair based on the sidelink signal or the signal quality for use in the first resource region, and may also determine a resource region to be used for such reselection of the beam pair (S905). For example, when a measurement value for the sidelink signal is less than a first threshold value, the first UE may perform the operation of changing or reselecting the beam pair. In this case, the operation related to reselection of the beam pair may be at least one of the Tx/Rx operation of the beam measurement reference signal (RS) and the beam sweeping operation. In addition, the above signal quality or the measurement value for the sidelink signal may be RSRP (Reference Signal Received Power), RSRQ (Reference Signal Received Quality), SNR (Signal-to-noise ratio) and/or SINR (Signal to Interference plus Noise Ratio).

On the other hand, when the first UE supports execution of sidelink communication using the plurality of resource regions, the first UE may determine a resource region for reselecting a beam pair for each of the at least one resource region on the basis of a measurement value for each of the at least one resource region from among the plurality of resource regions.

Alternatively, when a measurement value for the sidelink signal is less than the first threshold value or is equal to or higher than a second threshold value, the first UE may perform beam pairing (or selection of the beam pair) to search for a new beam pair within the first resource region, or may perform beam pairing (or reselection of the beam pair) to search for a new beam pair in any one of the plurality of resource regions linked to the first discovery resource region. Here, information as to whether to perform beam pairing in the first resource region, or information as to whether to perform beam pairing in a second resource region selected from among the plurality of resource regions can be determined as follows.

Specifically, information as to whether to perform beam pairing in the second resource region on the basis of a CP length, maximum transmission (Tx) power, and/or a congestion level configured or measured in each of the plurality of resource regions may be determined. For example, if there is a resource region having a longer CP length than the CP length configured in the first resource region from among the plurality of resource regions, if there is a resource region in which transmit (Tx) power greater than the maximum Tx power configured in the first resource region is configured, or if there is a resource region in which a lower congestion level than the congestion level measured in the first resource region is measured, the first UE may determine a resource region to be used for reselection of the beam pair to be another resource region (the second resource region) rather than the first resource region. In other words, the first UE may determine a resource region in which the longer CP length than the first resource region is constructed, a resource region in which greater maximum transmit (Tx) power is constructed, or a resource region in which a lower congestion level was measured may be determined to be a second resource region to be used for reselection of the beam pair. In this case, the first UE may change the resource region (i.e., the first resource region) for communication to the second resource region (or may perform switching of BWP and resource pool), and/or may perform reselection of the beam pair to search for a new beam pair in the changed second resource region. In this case, the second resource region may be a resource region having the longest CP length, the highest maximum transmit (Tx) power or the lowest congestion level from among the plurality of resource regions.

Alternatively, when a measurement value for the sidelink signal is less than the second threshold value and is equal to or higher than a third threshold value, the first UE may perform the operation of reselecting the beam pair in any one of the plurality of resource regions linked to a new discovery resource region (or re-execution of the discovery operation) rather than the plurality of resource regions linked to the first discovery resource region. Specifically, the first UE may select any one of the plurality of discovery resource regions preconfigured for the discovery operation, and may exchange a discovery message in the one discovery resource region (or the second discovery resource region). The first UE may select or determine one resource region (or a third resource region) from among the resource regions linked to the second discovery resource region through exchange of the discovery message. That is, the first UE may determine the third resource region to be a resource region scheduled to be used for reselection of the beam pair. In this case, the first UE may allow the communication resource region to switch from the first resource region to the third resource region (or switching of a BWP and a resource pool), and may perform beam pairing for searching for a new beam pair in the changed third resource region. That is, when a measurement value for the sidelink signal is less than the second threshold value and is equal to or higher than a third threshold value, the first UE may again perform the discovery procedure, so that the first UE can re-determine the resource region for communication and can determine the redetermined resource region to be a resource region to be used for reselection of the beam pair.

Alternatively, when a measurement value for the sidelink signal is less than the second threshold value and is equal to or higher than a third threshold value, the first UE may select or determine the third resource region corresponding to any one resource region (selected based on the CP length, the maximum Tx power and/or the congestion level) from among the plurality of resource regions linked to the second discovery resource region. For example, the first UE may select or determine the resource region in which the longest CP length is configured, the highest maximum Tx power is configured and/or the lowest congestion level is measured from among the plurality of resource regions linked to the second discovery resource region, to be the third resource region. The first UE may change (or may perform switching of a BWP and resource pool) the resource region to the selected or determined third resource region, and may perform beam pairing for determining or selecting a new beam pair in the changed third resource region. In this case, the first UE may perform transmission and reception of the sidelink signal or sidelink communication in the third resource region through a beam pair formed according to the result of beam pairing.

Alternatively, in connection with the operation of reselecting the beam pair, the first UE may transmit, to the second UE corresponding to the counterpart UE, a message including a beam sweeping direction related to reselection of the beam pair, a start beam index for beam sweeping, and resource information of the beam management RS.

On the other hand, the magnitude of the threshold value may be preconfigured to be arranged in the order of the first threshold value→the second threshold value→the third threshold value. For example, the first threshold value may be higher than each of the second threshold value and the third threshold value, and the second threshold value may be higher than the third threshold value. In addition, the first threshold value, the second threshold value, and the third threshold value may be preconfigured as a threshold value for RSRP (Reference Signal Received Power), RSRQ (Reference Signal Received Quality), SNR (Signal-to-noise ratio) or SINR (Signal to Interference plus Noise Ratio).

Alternatively, when the second UE detects a situation in which reselection of the beam pair is required, the second UE may transmit, to the first UE, a signal or information for requesting reselection or redetermination of the resource region to be used for reselection of the beam pair. Specifically, the second UE may determine a first resource region for communication through exchange of the discovery message within the first discovery resource region, and may receive a sidelink signal from the first UE in the first resource region. If the measurement value for the sidelink signal is measured to be less than the first threshold value, the second UE may transmit, to the first UE, information and/or a signal for determining or reselecting the resource region to be used for reselection of the beam pair. In this case, the second UE may receive at least one of a request for re-performing the discovery procedure, a request for performing switching of the resource region to a specific resource region, and a request for performing beam sweeping for reselection of the beam pair.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 17:
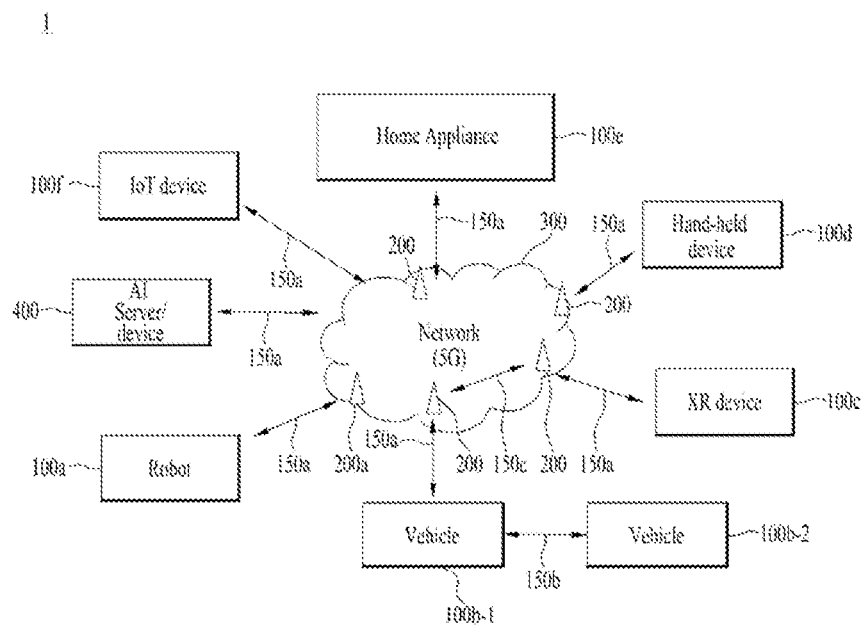
FIG. 17 illustrates a communication system applied to the present disclosure.

FIG. 17 illustrates a communication system applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 18:
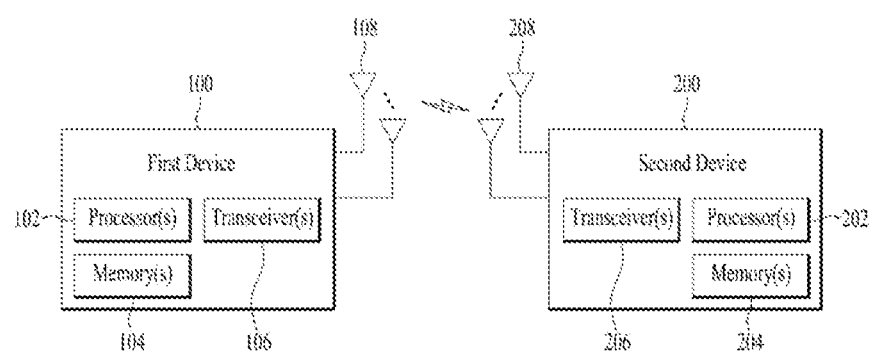
FIG. 18 illustrates wireless devices applicable to the present disclosure.

FIG. 18 illustrates a wireless device applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include a processor 102 and a memory 104 that are connected to the RF transceiver. The memory 104 may include at least one program capable of performing the operation related to the embodiments shown in FIGS. 10 to 23.

The processor 102 may control the RF transceiver to exchange a discovery message in the first discovery resource region, may determine a first resource region for communication through the exchanged discovery message, may control the RF transceiver to transmit a sidelink signal to the second UE in the first resource region, may determine a resource region to be used for reselection of the beam pair on the basis of a measurement value for the sidelink signal less than the first threshold value, and may allow the first discovery resource region to be pre-linked to the plurality of resource regions for communication. The processor 102 may perform determination of the beam pair and transmission of the sidelink signal according to the embodiments for determining a resource region associated with reselection of the beam pair described in FIGS. 10 to 16 based on the program included in the memory 104.

Alternatively, the chip set including the processor 102 and the memory 104 may be configured. In this case, the chip set may include at least one processor, and at least one memory operatively connected to the at least one processor and configured to store instructions such that the at least one processor performs specific operations by executing the instructions. The specific operations may include exchanging a discovery message in the first discovery resource region, determining a first resource region for communication through the exchanged discovery message, transmitting a sidelink signal to the second UE in the first resource region, determining a resource region to be used for reselection of the beam pair on the basis of a measurement value for the sidelink signal less than the first threshold value, and allowing the first discovery resource region to be pre-linked to the plurality of resource regions for communication. The processor 102 may perform determination of the beam pair and transmission of the sidelink signal according to the embodiments for determining a resource region associated with reselection of the beam pair described in FIGS. 10 to 146 based on the program included in the memory 104.

Alternatively, a computer-readable storage medium is configured to store at least one computer program including instructions such that at least one processor performs specific operations by executing the instructions. The specific operations may include exchanging a discovery message in the first discovery resource region, determining a first resource region for communication through the exchanged discovery message, transmitting a sidelink signal to the second UE in the first resource region, determining a resource region to be used for reselection of the beam pair on the basis of a measurement value for the sidelink signal less than the first threshold value, and allowing the first discovery resource region to be pre-linked to the plurality of resource regions for communication. The processor 102 may perform determination of the beam pair and transmission of the sidelink signal according to the embodiments for determining a resource region associated with reselection of the beam pair described in FIGS. 10 to 16 based on the program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may control the RF transceiver to transmit a sidelink signal to at least one first UE, and may receive a feedback signal for the first sidelink signal. The sidelink signal may include angle information for specifying a transmission target of the feedback signal. The feedback signal may be received from the first UE located in an angle range corresponding to the angle information from among the at least one first UE. The processor 202 may allow information for specifying a feedback target UE to be included in the sidelink signal described in FIGS. 10 to 13 based on the program included in the memory 104, and may perform the operation of embodiments in which the feedback signal for the sidelink signal is received from the specified Rx UE according to the above information included in the sidelink signal.

Alternatively, the chip set including the processor 102 and the memory 104 may be configured. In this case, the chip set may include at least one processor, and at least one memory operatively connected to the at least one processor and configured to store instructions such that the at least one processor performs specific operations by executing the instructions. The specific operations may include transmitting a sidelink signal to at least one first UE, and receiving a feedback signal for the first sidelink signal. The sidelink signal may include angle information for specifying a transmission target of the feedback signal. The feedback signal may be received from the first UE located in an angle range corresponding to the angle information from among the at least one first UE. The processor 202 may allow information for specifying a feedback target UE to be included in the sidelink signal described in FIGS. 10 to 16 based on the program included in the memory 104, and may perform the operation of embodiments in which the feedback signal for the sidelink signal is received from the specified Rx UE according to the above information included in the sidelink signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 19:
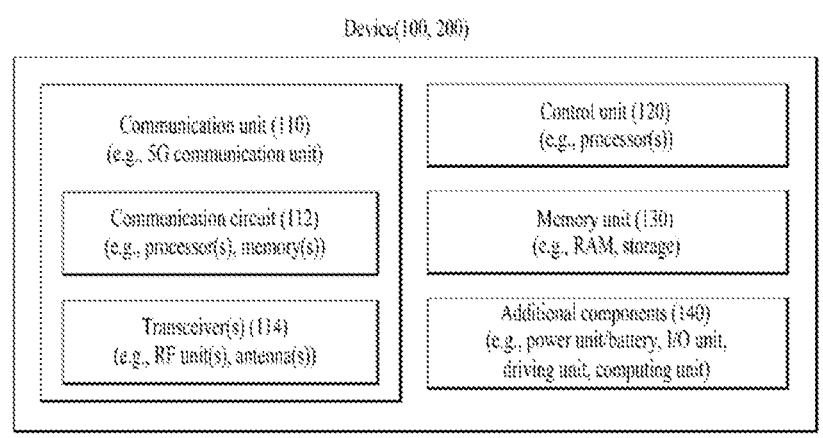
FIG. 19 illustrates another example of a wireless device to which the present disclosure is applied. The wireless device may be implemented in various forms according to use-examples/services.

FIG. 19 illustrates another example of a wireless device applied to the present disclosure. The wireless device may be implemented in various forms according to a use-case/service (refer to FIG. 17)

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 214, the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 20:
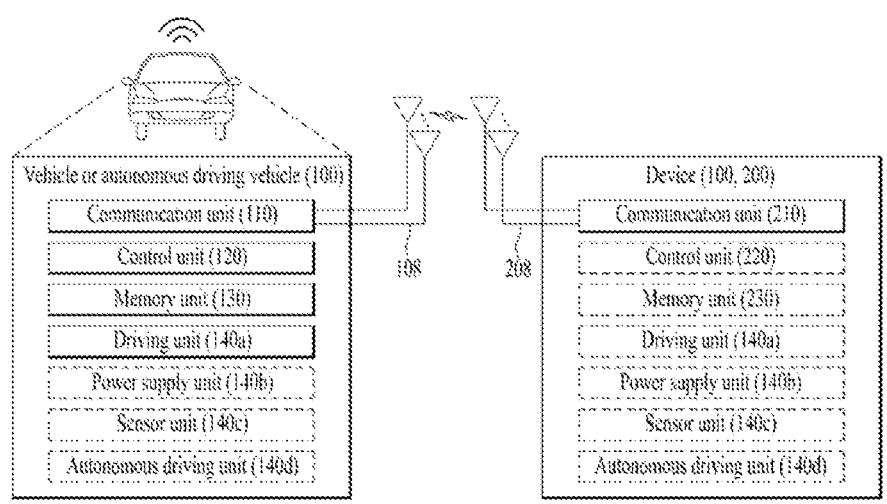
FIG. 20 illustrates a vehicle or an autonomous driving vehicle applied to the present disclosure.

Examples of Vehicles or Autonomous Vehicles to which the Present Disclosure is Applied FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method for performing beam pairing by a first user equipment (UE) in a wireless communication system comprising:
   determining a first resource region for communication through exchange of a discovery message in a first discovery resource region; and
   transmitting a signal to a second user equipment (UE) in the first resource region,
   wherein the first discovery resource region is pre-linked to a plurality of resource regions for communication; and
   determining a resource region as the first resource region among the plurality of resource regions to be used for reselection of a beam pair based on a measurement value for the signal less than a first threshold value and equal to or higher than a second threshold value.

2. The method according to claim 1, wherein reselection of the beam pair is performed in a second resource region selected based on at least one of a maximum transmit power, a congestion level, and a cyclic prefix (CP) length from among the plurality of resource regions.

3. The method according to claim 2, wherein the second resource region is a resource region in which a CP length longer than a CP length for the first resource region is configured, a maximum transmit power greater than a maximum transmit power for the first resource region is configured, or a congestion level lower than a congestion level for the first resource region is configured in the first resource region.

4. The method according to claim 2, wherein the second resource region is a resource region in which the highest maximum transmit power is configured, the lowest congestion level is measured, or the longest CP length is configured, from among the plurality of resource regions.

5. The method according to claim 1, wherein based on a measurement value for the signal that is less than the second threshold value and is equal to or higher than a third threshold value, reselection of the beam pair is performed in a third resource region linked to a second discovery resource region.

6. The method according to claim 5, wherein each of the second threshold value and the third threshold value is preconfigured with a value lower than the first threshold value.

7. The method according to claim 6, wherein the third resource region is a resource region selected from among resource regions for communication linked to the second discovery resource region based on at least one of a maximum transmit power, a congestion level, and a CP length.

8. The method according to claim 1, wherein the reselection of the beam pair includes at least one of a transmission/reception (Tx/Rx) operation and a beam sweeping operation of a beam measurement reference signal.

9. The method according to claim 1, wherein the measurement value of the signal is a measurement value for a reference signal received power (RSRP), a reference signal received quality (RSRQ), a signal-to-noise ratio (SNR), or a signal to interference plus noise ratio (SINK).

10. The method according to claim 1, wherein the first UE transmits, to the second UE, at least one of a beam sweeping direction related to reselection of the beam pair, a beam sweeping start beam index, and resource information of a beam management reference signal.

11. A method for performing beam pairing by a second user equipment (UE) in a wireless communication system comprising:
   determining a first resource region for communication through exchange of a discovery message in a first discovery resource region; and
   receiving a signal from a first user equipment (UE) in the first resource region,
   wherein the first discovery resource region is pre-linked to a plurality of resource regions for communication; and
   wherein the first UE determines a resource region as the first resource region among the plurality of resource regions to be used for reselection of a beam pair based on a measurement value for the signal less than a first threshold value and equal to or higher than a second threshold value.

12. A first user equipment (UE) configured to perform beam pairing in a wireless communication system, the first UE comprising:
   a radio frequency (RF) transceiver; and
   a processor connected to the RF transceiver,
   wherein the processor is configured to determine a first resource region for communication through exchange of discovery message in a first discovery resource region, transmit a signal to a second user equipment (UE) in the first resource region under control of the RF transceiver, wherein the first discovery resource region is pre-linked to a plurality of resource regions for communication, and determine a resource region as the first resource region among the plurality of resource regions to be used for reselection of a beam pair based on a measurement value for the signal less than a first threshold value and equal to or higher than a second threshold value.

13. A chip set configured to perform beam pairing in a wireless communication system, the chip set comprising:
   at least one processor; and
   at least one memory operatively connected to the at least one processor, and configured to store instructions such that the at least one processor performs specific operations by executing the instructions,
   wherein the specific operations include determining a first resource region for communication through exchange of a discovery message in a first discovery resource region, transmitting a signal to a second user equipment (UE) in the first resource region, wherein the first discovery resource region is pre-linked to a plurality of resource regions for communication, and determining a resource region as the first resource region among the plurality of resource regions to be used for reselection of a beam pair based on a measurement value for the signal less than a first threshold value and equal to or higher than a second threshold value.

14. The chip set according to claim 13, wherein the processor is configured to control a driving mode of a device connected to the chip set, based on the determined resource region.

* * * * *